Nov. 21, 1933.   H. L. POPE   1,936,263

MULTIPLE SPINDLE CONTINUOUS MILLING MACHINE

Filed April 4, 1932   2 Sheets-Sheet 1

Inventor
HOWARD L. POPE

Nov. 21, 1933.                H. L. POPE                1,936,263
          MULTIPLE SPINDLE CONTINUOUS MILLING MACHINE
              Filed April 4, 1932        2 Sheets-Sheet 2

Inventor
HOWARD L. POPE

Patented Nov. 21, 1933

1,936,263

UNITED STATES PATENT OFFICE 1,936,263

MULTIPLE SPINDLE CONTINUOUS MILLING MACHINE

Howard L. Pope, Blue Ash, Ohio, assignor to The Cincinnati Milling Machine Company, Cincinnati, Ohio, a corporation of Ohio Application April 4, 1932. Serial No. 602,891

8 Claims. (Cl. 90—16)

This invention relates to milling machines and more particularly to an improved type of continuous milling machine.

Multiple spindle machines of the past have usually had their spindles arranged in a series transversely of the table, which arrangement is not suitable for work in which the cutting has to be done in successive steps or simultaneously on longitudinally spaced surfaces. For instance, it is desirable that certain types of work having spaced parallel faces in the form of steps be milled in a single set up to insure parallelism of the finished surfaces. For production reasons it is necessary that these faces be milled simultaneously to save operating time and therefore preferable that the machining be performed by continuous milling methods; that is, wherein the operator removes a finished piece and loads a new one while a second piece is being machined. In such a method, work holders are spaced longitudinally of a work table upon opposite sides of a cutting means and the table reciprocated to effect alternate engagement of the work with the cutter. The usual arrangement of the cutting means consisted of placing a pair of different diameter axially spaced cutters on a common arbor and arranging the work upon the table so that the cutters cooperated with surfaces in their respective planes.

The objections to this method of finishing such surfaces are that if the planes of the surfaces are widely separated the cutting speeds of the two cutters are considerably different and the feed rate must necessarily be controlled by the rate of movement of the faster cutter; the cutters cannot be adjusted to vary the distance between the two cutting planes; the feed stroke must include the approach stroke as well as the length of the surface to be finished and the type of finish is not as smooth as may be obtained by other methods of cutting.

Other types of work have surfaces which must be rough and finish milled and it is desirable that these surfaces be finished successively in one set-up to economize on production time. This type of work is similar to the preceding type except that the spaced parallel surfaces are superimposed upon one another and therefore can only be finished separately.

It is therefore one of the objects of this invention to provide an improved multiple spindle continuous milling machine in which the spindles may be variously arranged longitudinally of the path of table movement to mill simultaneously surfaces arranged in progressive steps lying parallel to the cutting plane; or to rough and finish mill successively a given surface on a work piece in one continuous operation.

Another object of this invention is to provide a continuous type milling machine for milling spaced parallel surfaces in which the cutters for the respective surfaces are adjustable relative to one another whereby work having variable spacings between parallel surfaces may be easily and quickly accommodated in the machine.

A further object of this invention is to provide a continuous milling machine for milling spaced parallel surfaces in which the cutting speed of all the cutters is the same, thereby insuring more uniform results and the attainment of better finish on the work.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1:
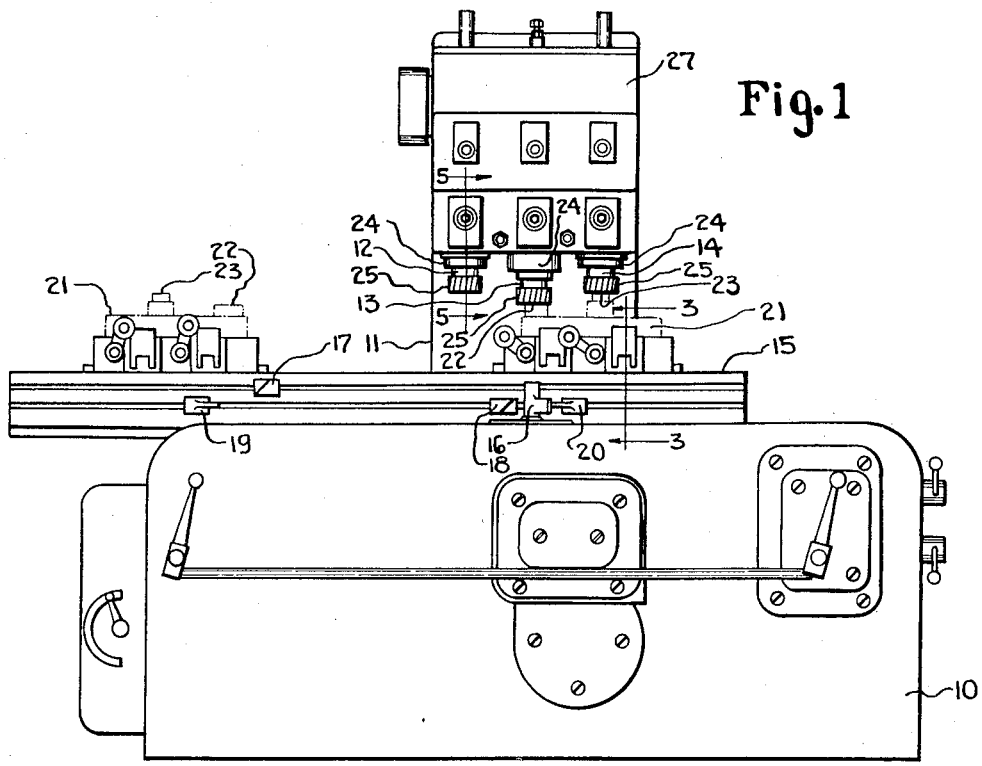
Figure 1 is a front elevation of the machine embodying the principles of this invention.
Figure 2:
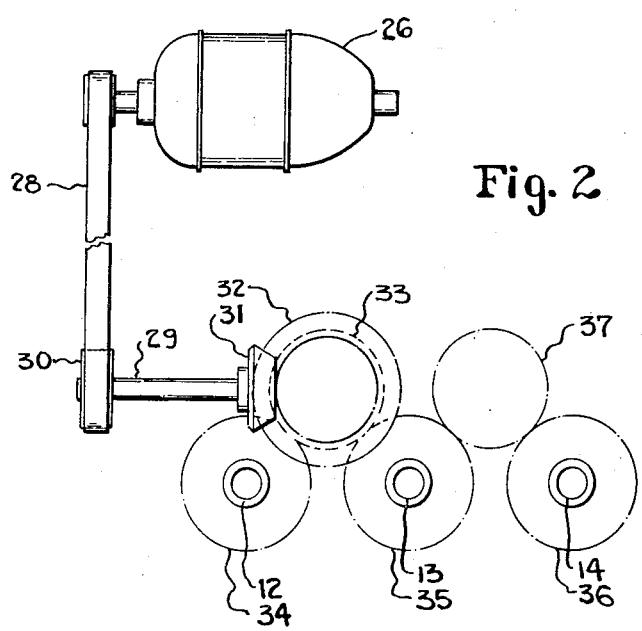
Figure 2 is a diagrammatic view of the spindle transmission.

A machine, embodying the principles of this invention, has been illustrated in Figure 1 and comprises a bed or work support 10 having a column 11 arising at one side of the bed, the column serving as a cutter supporting structure in which a plurality of cutter spindles 12, 13 and 14 are journaled; and the bed 10, as a support for a work table 15 which is mounted on the top thereof for reciprocation transversely of the spindles. Although the spindles have been vertically arranged in the illustration, it will be understood that they may be arranged horizontally without departing from the invention.

The table is adapted to be reciprocated transversely of the cutters in a constantly recurring cycle known as continuous milling, comprising movement up to the cutter at a rapid traverse rate by means of which a work piece is moved to its respective cutting means, a feed movement in the same direction during which time a new work piece is fixed to the other end of the table, and a reversal in direction of table movement followed by a repetition of the approach and feed movements for the work piece on the opposite end of the table. During the approach and feed of the second work piece, the first work holder is withdrawn from cooperation with the cutter and the work piece therein removed and a new piece placed in its stead.

These movements may be effected either manually or by power means. Such power means may comprise any known mechanical or hydraulically operated feed transmission. If such power mechanism is utilized, automatic trip control means are usually associated therewith in order that the operator's attention may be confined to the unloading and loading operations. Such trip control means may comprise a plunger 16, which may be reciprocable by trip dogs such as 17 and 18, to determine the rate of movement of the work support and rotatable by reversing dogs 19 and 20, suitably spaced along the edge of the table, to determine the direction of table movement. Such a plunger is adapted for controlling either mechanical or hydraulic operation, such mechanical operation being shown in patent to Hazelton, Patent No. 1,390,706 and the hydraulic operation being shown in copending application, Serial No. 220,721 filed on September 15, 1927.

The plunger 16 may have an additional neutral position to which it is movable manually to stop operation of the machine or additional manually actuated stop mechanism may be provided. From the foregoing it will be seen that the table is therefore adapted to move in recurring cycles of feed and rapid traverse in opposite directions under automatic power control whereby work pieces on opposite ends of the table will be moved alternately toward and from the cutting means.

As shown in Figure 1, the cutting means comprises a plurality of spindles 12, 13 and 14 spaced longitudinally of the table, and each spindle is mounted in a quill 24 by means of which the relative position of each cutter with respect to the surface of the work and with respect to each other may be independently determined.

Figures 5, 6:
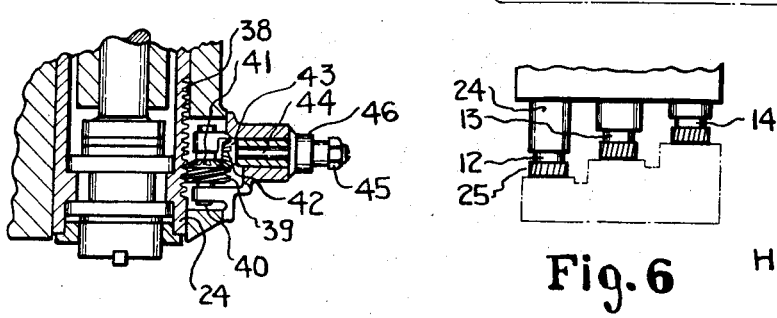
Figure 5 is a detailed section of the spindle arbor adjusting mechanism as viewed on the line 5—5 of Figure 1.
Figure 6 is a diagrammatic view of a modified arrangement of the cutters.

As shown in Figure 5, the quill is provided with a plurality of rack teeth 38 cut in the periphery thereof and engaged by a spiral gear 39 pivotally mounted on a shaft 40 and having bevel gear teeth 41 formed upon one end thereof. These bevel teeth mesh with similar teeth 42 formed on the bevel pinion 43 which is secured to the end of a rotatable shaft 44. A hexagonal head 45 or other operating means may be secured to the outer end of the shaft 44 for effecting rotation thereof and thereby axial adjustment of the arbor and contained cutter spindle. A dial 46 may be secured to the shaft to indicate the amount of vertical adjustment of the spindle. By similar adjusting means all of the cutter spindles may be variably positioned relative to one another and with respect to the surface of the table.

Figure 3:
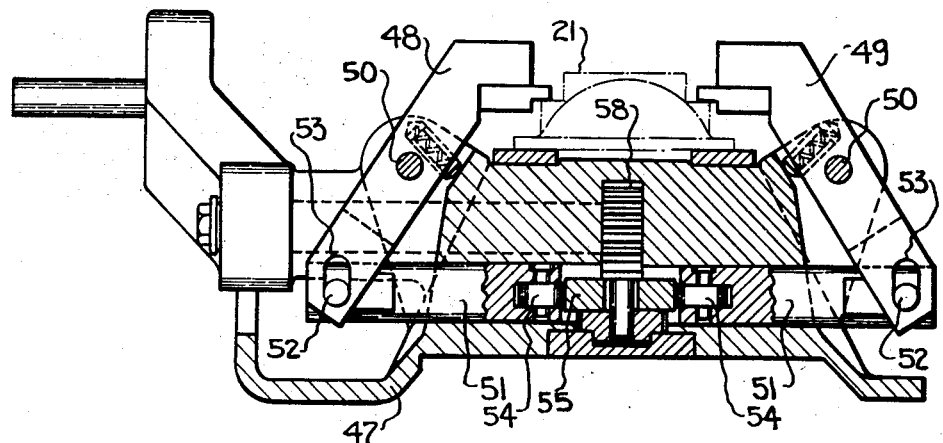
Figure 3 is a section through the work support as viewed on the line 3—3 of Figure 1.
Figure 4:
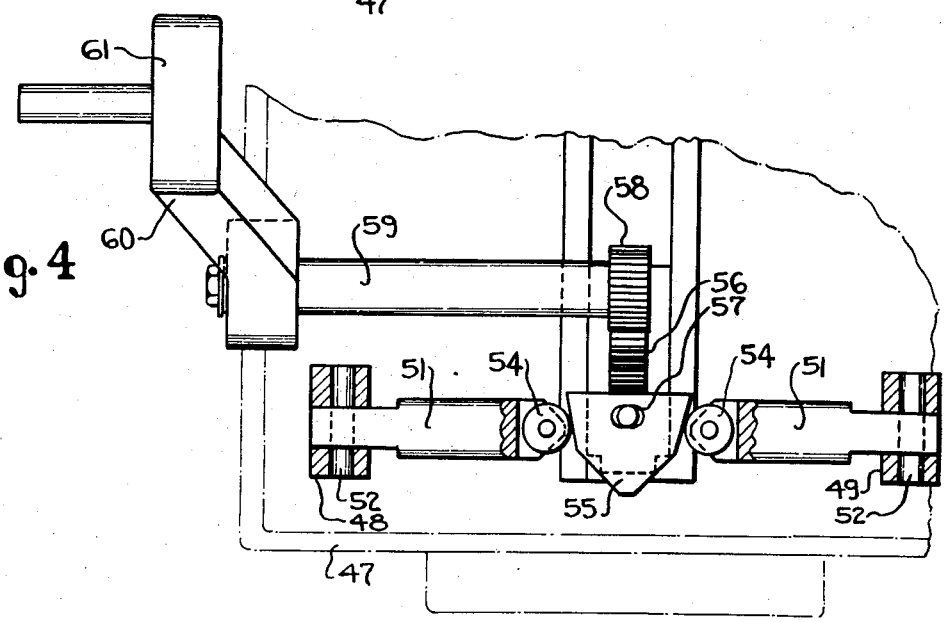
Figure 4 is a detailed view of the work fixture operating mechanism.

Suitable means have been supplied for securing the work to the table, one such work holder being illustrated more particularly in Figures 3 and 4. The reference numeral 47 indicates the base of such a holder having a pair of opposed clamping jaws 48 and 49 pivotally mounted on similar supporting pins 50 fixed in the base of the fixture.

Each clamping member is connected at the lower end to a reciprocable plunger 51 having a pin 52 therein engaging a slot 53 formed in the lower end of the clamping jaw to compensate for radial movement thereof. The inner end of each plunger 51 has a roller 54 mounted in the end thereof, engaging the sides of wedge cam member 55. This cam plate is pivotally mounted at 57 upon a reciprocating rack member 56 permitting a certain amount of lost motion so that the clamping pressure on the plungers 51 will be equalized.

A pinion 58 secured to the end of a rotatable shaft 59 engages the rack member 56 whereby upon rotation of the shaft 59 by a weighted lever 60, the cam plate 55 will be wedged between the plungers causing inward movement of the clamping members 58 and 59. The operating lever 60 has a large weight 61 attached to the end thereof whereby upon movement of the lever beyond a central position the weight will act by gravity to wedge the cam plate between the rollers and hold the parts in clamped position. Any number of pairs of these clamping jaws may be arranged longitudinally in each work holder, whereby work pieces of considerable length may be secured longitudinally of the table on both ends thereof.

A work piece such as 21 has been selected to represent one type of work which may be finished in the machine. This piece has spaced parallel surfaces 22 and 23 and the work is mounted so that the surfaces are arranged longitudinally of the table whereby it is possible for cutters to engage both surfaces simultaneously for finishing the same. A central cutter 25 secured to the end of spindle 13 is axially positioned to engage alternately the lowest surface, such as 22, of each work piece. The adjacent cutters on either side are stepped back with respect to the cutting plane of the central cutter so as to engage the next higher surfaces such as 23 of the work, each cutter finishing the surface of the work that is on its respective side of the central cutter. If a second step was to be formed on the work it is apparent that a second pair of cutters could be placed on the outside of spindles 12 and 14. It is thus apparent that the number and positioning of the cutters depends upon the number of different planes to be finished, it being remembered that the central cutter cooperates with the same surface on each work piece while the remaining cutters cooperate with the surfaces on their respective sides of the central cutter.

The spindles are adapted to be rotated by a motor 26 mounted in the upper part 27 of the column which through a belt 28 effects rotation of shaft 29 by means of a pulley 30 attached to one end of the shaft. A bevel gear 31 secured to the end of shaft 29 meshes with a bevel gear 32 having integral therewith a spur gear 33 meshing with a pair of gears 34 and 35, the gear 34 being splined to the spindle 12 and the gear 35 being splined to the spindle 13. The gear 35 is also coupled with a gear 36 through pinion 37, the gear 36 being splined to the spindle 14. It will thus be seen that all the spindles are driven from a common prime mover and that they all rotate in the same direction. The nature of the transmission is such that it may be utilized for rotating the spindles in either a horizontal or vertical plane since the nature of the invention is such that it lends itself to either method of positioning the cutters with respect to the work.

The same arrangement of cutters may be utilized for effecting roughing and finishing operations on alternate work pieces by continuous milling methods in which case upon movement of the work table toward the left, for instance, the cutter 25 on spindle 14 would be axially positioned to take a rough cut on the surface 22 and the cutter on spindle 13 positioned to take a finishing cut. Upon return movement of the table, the work in the opposite fixture would be subjected to the same roughing and finishing operations by the cutters on spindles 12 and 13 while the work was being changed in the first fixture. It will be noted that the cutter on the middle spindle 13 cooperates with each fixture.

Another method of arranging the cutters is diagrammatically illustrated in Figure 6 in which the cutters may be arranged in three successive steps for finishing three successive surfaces, all on one work piece and spaced longitudinally thereof, each succeeding step being higher than the preceding step. It is of course apparent that in such a case only one work fixture could be utilized. Other types of work having one surface to be rough and finished milled and a second surface to be simply plain milled, could also be finished by this arrangement of cutters.

It should thus be apparent that a multiple spindle continuous milling machine for finishing work pieces having a series of spaced parallel surfaces arranged longitudinally of the work table has been provided, by means of which the various surfaces may be finished by continuous milling methods; which is so constructed that the work may be finished in a minimum amount of time; and in which the cutting speeds for each surface is the same insuring better finish thereof; and in which the various cutters may be adjusted relative to one another, insuring greater accuracy and making possible a machine which is capable of handling a greater variety of work.

What is claimed is:

1. A continuous milling machine having in combination a bed, a work table reciprocably mounted upon the bed, a center spindle overlying the table, additional cutter spindles mounted on either side thereof in overlying relation with respect to the table, cutters attached to the spindles and work fixtures spaced longitudinally of the table on opposite sides of the cutters, said fixtures cooperating with the cutters on their respective sides of the center cutter to finish one surface of the work and alternately with the center cutter to finish a second surface on the work.

2. A continuous milling machine having in combination a bed, a work table reciprocably mounted upon the bed, a plurality of cutter spindles spaced longitudinally of the path of table movement, cutters fixed to the ends of said spindles, means to adjust one of said cutters toward the table beyond the plane of the remaining cutters, and work fixtures mounted longitudinally of the table upon opposite sides of the cutters for holding multi-surface work pieces whereby upon reciprocation of the table one surface on each work piece will be finished by the same cutter and other surfaces on the work will be finished by different cutters.

3. A continuous milling machine having in combination a bed, a work table reciprocably mounted on the bed, a plurality of cutter spindles extending transversely of the path of table movement, means to rotate the spindles, cutters attached to the ends of said spindles, means to adjust the face of the cutters in planes successively spaced from the work, and work fixtures spaced longitudinally of the table for holding work pieces having spaced parallel surfaces thereon, said fixtures alternately cooperating with the cutters upon reciprocation of the table to present simultaneously successive surfaces to successive cutters.

4. A continuous milling machine having in combination a bed, a table reciprocably mounted on the bed, a plurality of power driven cutter spindles spaced longitudinally of the path of movement of the table, a finishing cutter attached to the central spindle, a roughing cutter attached to the spindles on each side of the central spindle, and spaced work holders mounted on the table for alternate movement into cooperation with the respective roughing cutters and successively thereafter into cooperative relation with the finishing cutter.

5. A milling machine having a bed, a table reciprocably mounted on said bed, a plurality of cutter spindles spaced longitudinally of the path of movement of the table, the axes of said spindles extending transversely of the table, cutters secured to the end of said spindles, means to effect simultaneous rotation of all of said spindles, a work fixture attached to the table for holding work pieces having a plurality of unfinished surfaces lying in spaced parallel planes, means to position the cutter farthest from the work in the plane of the lowest surface, means to position the remaining cutters in successively higher planes whereby upon movement of the work toward the cutters a plurality of successively elevated surfaces will be simultaneously milled by the respective cutters.

6. A milling machine having a bed, a table reciprocably mounted on the bed, a plurality of cutter spindles spaced longitudinally of the path of table movement, the axes of said spindles extending transversely of the table, cutters mounted on the ends of said spindles, a work fixture mounted on the table for holding a work piece having a pair of spaced surfaces one of which is to be roughed and finished milled, and means to adjust a successive pair of cutters to rough and finish mill said surface and the other to finish mill the remaining surface upon movement of the work toward the cutter.

7. A milling machine having in combination a bed, a table reciprocably mounted upon the bed, a cutter spindle extending transversely of the table, a finishing cutter attached to the end of the spindle, additional cutter spindles spaced upon opposite sides of the first named spindle, roughing cutters attached to the ends of these additional spindles, and work fixtures attached to opposite ends of the table for holding work pieces having surfaces to be rough and finish milled whereby upon movement of the table the work in one fixture will be moved into cooperative relation with one pair of cutters and upon movement in the other direction the work in the other fixture will be moved into engagement with another pair of cutters.

8. A milling machine having a bed, a table reciprocably mounted upon the bed, a plurality of cutter spindles extending transversely of the table including a center spindle, an additional spindle on either side thereof, and spaced work fixtures mounted on the table on opposite sides of the cutters for holding work pieces therein, whereby upon movement of the table each side spindle will cooperate with the fixture on its respective side of the center spindle and the center spindle will alternately cooperate with the work in each fixture.

HOWARD L. POPE.